United States Patent
Boldyrev et al.

(10) Patent No.: US 9,922,378 B2
(45) Date of Patent: Mar. 20, 2018

(54) METHOD AND APPARATUS FOR PROVIDING INTENT-BASED MONITORING USING SENSORY INFORMATION

(75) Inventors: Sergey Boldyrev, Söderkulla (FI); Jari-Jukka Harald Kaaja, Järvenpää (FI); Ian Justin Oliver, Söderkulla (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1018 days.

(21) Appl. No.: 13/337,409

(22) Filed: Dec. 27, 2011

(65) Prior Publication Data

US 2013/0166726 A1    Jun. 27, 2013

(51) Int. Cl.

| | | |
|---|---|---|
| G06F 15/16 | (2006.01) | |
| G06F 15/173 | (2006.01) | |
| G06Q 50/00 | (2012.01) | |
| G06Q 10/10 | (2012.01) | |
| G06Q 30/02 | (2012.01) | |

(52) U.S. Cl.
CPC .............. *G06Q 50/01* (2013.01); *G06Q 10/10* (2013.01); *G06Q 30/02* (2013.01)

(58) Field of Classification Search
CPC ............. H04L 65/1059; H04L 65/1063; H04L 65/4069; H04L 65/605; G06Q 50/01; G06Q 30/02; G06Q 10/10; G06Q 10/107
USPC ......................... 709/204, 219, 223–224, 250
See application file for complete search history.

(56) References Cited

U.S. PATENT DOCUMENTS

| | | | | |
|---|---|---|---|---|
| 8,487,888 B2* | 7/2013 | Wigdor | ............... | G06F 3/04883 345/173 |
| 8,856,167 B2* | 10/2014 | Higgins | ............... | G06F 17/3064 707/711 |
| 2005/0003804 A1* | 1/2005 | Huomo | ............... | G06Q 20/382 455/414.1 |
| 2005/0243019 A1* | 11/2005 | Fuller | ..................... | G06F 9/542 345/1.3 |
| 2006/0010240 A1* | 1/2006 | Chuah | .................... | G06Q 50/01 709/228 |
| 2006/0025220 A1* | 2/2006 | Macauley et al. | .............. | 463/42 |
| 2006/0218153 A1* | 9/2006 | Voon et al. | ..................... | 707/10 |
| 2007/0268856 A1* | 11/2007 | Wijting | ............... | H04W 40/248 370/328 |
| 2008/0146416 A1* | 6/2008 | Mueller | ............. | A63B 24/0021 482/8 |
| 2008/0305780 A1* | 12/2008 | Williams et al. | .......... | 455/414.1 |
| 2009/0055132 A1* | 2/2009 | Cheng | .................... | H04L 12/24 702/187 |

(Continued)

OTHER PUBLICATIONS

Baykas et al., "System Design Document", Mar. 13, 2010, pp. 1-15, IEEE 802.19-10/0055r3.

(Continued)

*Primary Examiner* — Farzana Huq

(74) *Attorney, Agent, or Firm* — Alston & Bird LLP

(57) ABSTRACT

An approach is provided for providing intent-based monitoring using sensory information. The monitoring platform determines to detect, at a device, sensory information from an environment, the environment relating to a user of the device, one or more other users, or a combination thereof. Next, the monitoring platform processes and/or facilitates a processing of the sensory information to determine intent information associated with the user, the one or more other users, or a combination thereof.

17 Claims, 13 Drawing Sheets

(56) References Cited

U.S. PATENT DOCUMENTS

| | | | |
|---|---|---|---|
| 2009/0063691 A1* | 3/2009 | Kalofonos | H04L 63/102 709/229 |
| 2009/0328136 A1* | 12/2009 | Wan | G06F 21/6245 726/1 |
| 2010/0076777 A1* | 3/2010 | Paretti | G06Q 30/02 705/1.1 |
| 2010/0146118 A1* | 6/2010 | Wie | H04L 67/306 709/225 |
| 2010/0299138 A1 | 11/2010 | Kim | |
| 2011/0014933 A1* | 1/2011 | Karmarkar | H04M 1/72547 455/466 |
| 2012/0096352 A1* | 4/2012 | Maor et al. | 715/706 |
| 2012/0109868 A1 | 5/2012 | Murillo et al. | |
| 2012/0110680 A1* | 5/2012 | Oliver | H04L 63/102 726/30 |
| 2012/0233238 A1* | 9/2012 | Braginsky | G06Q 30/0261 709/203 |
| 2012/0304265 A1* | 11/2012 | Richter | G06Q 10/00 726/7 |
| 2012/0316956 A1* | 12/2012 | Nath | G06Q 30/02 705/14.46 |
| 2013/0091441 A1* | 4/2013 | Pattan et al. | 715/753 |
| 2013/0190062 A1* | 7/2013 | Coulson | 463/7 |

OTHER PUBLICATIONS

Junell et al., "System description and reference model proposal", Sep. 5, 2010, pp. 1-23, IEEE 802.19-10/0110r0.

Seto et al., "Opportunistic Strategies for Lightweight Signal Processing for Body Sensor Networks", 6 pages, PETRA 2010, Greece.

D. Nunes et al., "A Web Service-based Framework Model for People-centric Sensing Applications Applied to Social Networking", Publication Date: Feb. 7, 2012, pp. 1688-1701, <http://www.mdpi.com/1424-8220/12/2/1688/htm >.

Banerjee, N. et al., *Virtual Compass: Relative Positioning to Sense Mobile Social Interactions*, Technical Report MSR-TR-2010-5, Microsoft Research (Jan. 2010). 25 pages.

Dickerson, R. F. et al., *Empath: a Continuous Remote Emotional Health Monitoring System for Depressive Illness*, Wireless Health '11 (Oct. 10-13, 2011) 10 pages.

Do, T. M. T. et al., *Contextual Grouping: Discovering Real-Life Interaction Types from Longitudinal Bluetooth Data*, 2011 $12^{th}$ IEEE International Conference on Mobile Data Management (2011) 256-265.

Ernest, J., *Creating New Business Oportunities Through Ubiquitous Computing*, Palo Alto Research Center (2008), 13 pages.

Xie, H., *Observable Context-Based User Intention Specification in Context-Aware Enviornments*, 2011 $35^{th}$ IEEE Annual Computer Software and Application Conference, IEEE Computer Society (2011), 712-715.

The Perceptual Intelligence Lab, [online] [retrieved Jul. 6, 2015]. Retrieved from the Internet: http://web.archive.org/web/20120112044030/http://pi-lab.nde.nl/research.html. (Jan. 12, 2012) 2 pages.

\* cited by examiner

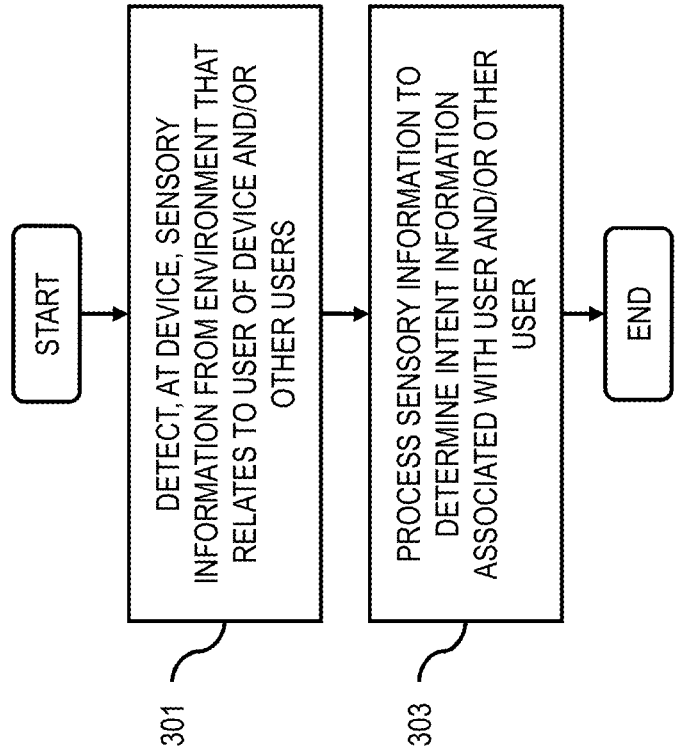

METHOD AND APPARATUS FOR PROVIDING INTENT-BASED MONITORING USING SENSORY INFORMATION

BACKGROUND

Service providers and device manufacturers (e.g., wireless, cellular, etc.) are continually challenged to deliver value and convenience to consumers by, for example, providing compelling network services. One area of interest has been the development of services and technologies related to monitoring of social interactions. For example, in recent years, the monitoring of social network connections initiated by users have enabled social network providers to assist users in developing further connections with other users (e.g., by providing connection suggestions). Nonetheless, it may be advantageous to guide the interactions between users based on the respective user's intent derived from sensory information, for instance, to correct the level of the social network connections, to ensure that the interactions are in compliance with privacy or security policies, etc.

SOME EXAMPLE EMBODIMENTS

Therefore, there is a need for an approach for providing intent-based monitoring using sensory information.

According to one embodiment, a method comprises determining to detect, at a device, sensory information from an environment, the environment relating to a user of the device, one or more other users, or a combination thereof. The method also comprises processing and/or facilitating a processing of the sensory information to determine intent information associated with the user, the one or more other users, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine to detect, at a device, sensory information from an environment, the environment relating to a user of the device, one or more other users, or a combination thereof. The apparatus is also caused to process and/or facilitate a processing of the sensory information to determine intent information associated with the user, the one or more other users, or a combination thereof.

According to another embodiment, a computer-readable storage medium carries one or more sequences of one or more instructions which, when executed by one or more processors, cause, at least in part, an apparatus to determine to detect, at a device, sensory information from an environment, the environment relating to a user of the device, one or more other users, or a combination thereof. The apparatus is also caused to process and/or facilitate a processing of the sensory information to determine intent information associated with the user, the one or more other users, or a combination thereof.

According to another embodiment, an apparatus comprises means for determining to detect, at a device, sensory information from an environment, the environment relating to a user of the device, one or more other users, or a combination thereof. The apparatus also comprises means for processing and/or facilitating a processing of the sensory information to determine intent information associated with the user, the one or more other users, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing intent-based monitoring using sensory information, according to one embodiment;

DESCRIPTION OF SOME EMBODIMENTS

Examples of a method, apparatus, and computer program for providing intent-based monitoring using sensory information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
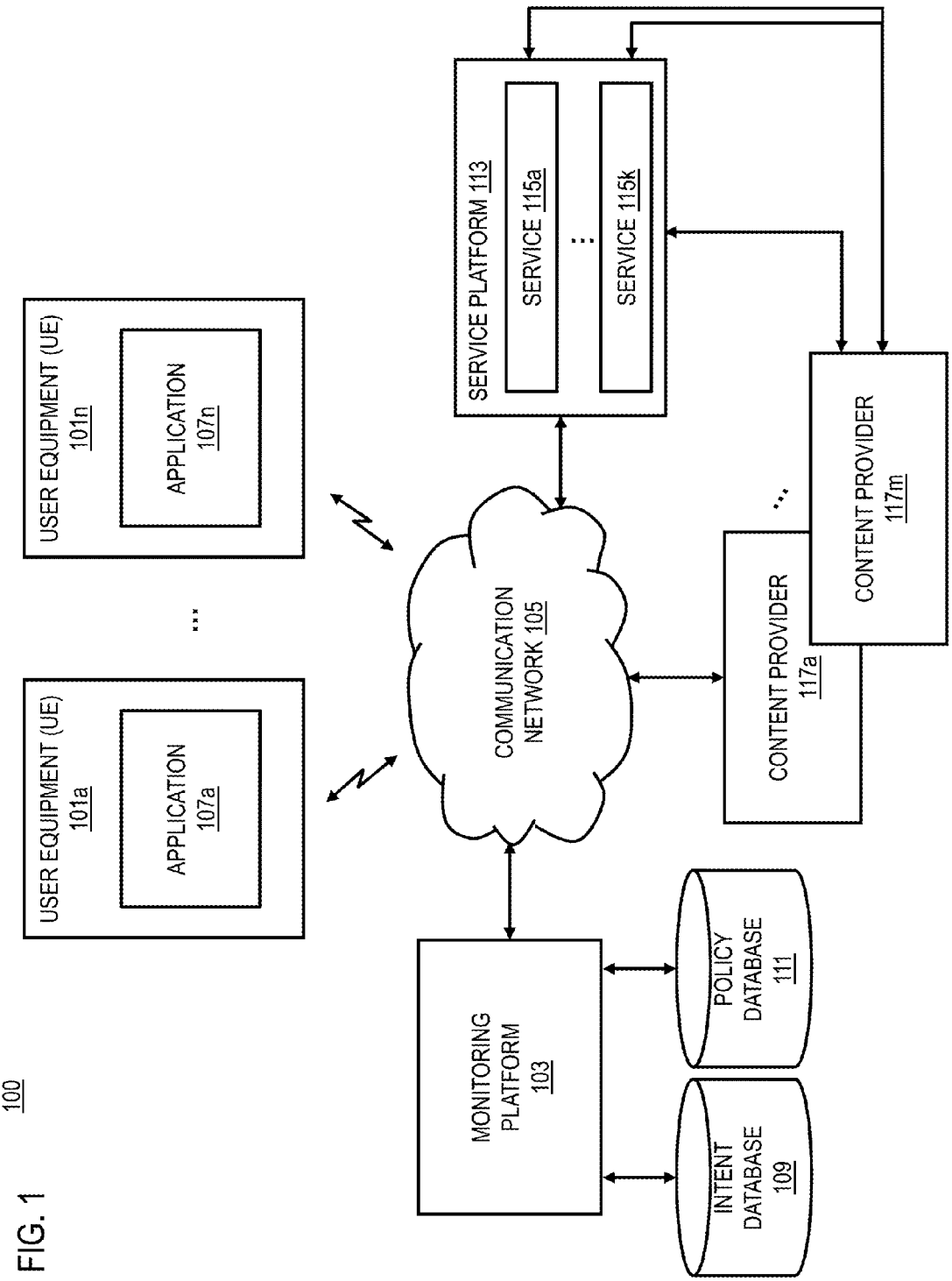
FIG. 1 is a diagram of a system capable of providing intent-based monitoring using sensory information, according to one embodiment.

FIG. 1 is a diagram of a system capable of providing intent-based monitoring using sensory information, according to one embodiment. As indicated, in recent years, social interaction monitoring has enabled the growth of social network connections among social network users. Social network providers have, for instance, assisted in developing those connections by suggesting potential connections between its users based on a determination of social network connections previously initiated by its users. In addition, monitoring of social interactions has been utilized in many other situations. In general, social interactions create both positive and negative feelings, which can be hidden or visible in the real world. When such interactions are moved to digital world implementations, available digital methods can be dictated and mapped to correspond to those phenomena (e.g., how to describe social happenings (status updates), what to tell and whom to tell (updates to be visible), how the interactions goes (what connectivity channels to be used), how to tell and create secrets (limit the data visibility), where to set limits (etiquettes and rules regarding publication), how information is passed (informal way via social channels through mesh social networks), how the data integrity is kept (to prevent data loss), etc.). Notwithstanding the particular environment (e.g., the Internet, a business meeting, a get-together between acquaintances, etc.), it may be advantageous to guide social interactions using intent information based on sensory information derived from the environment. For example, unguided interactions between users may lead to undesired conduct by the respective users, such as an establishment of a "friend" connection when the respective users are not even friendly acquaintances, the unintentionally disclosure of confidential information while engaging in a friendly conversation with an acquaintance, etc.

To address this problem, a system 100 of FIG. 1 introduces the capability to provide intent-based monitoring using sensory information. Specifically, the system 100 may detect, at a device, sensory information from an environment relating to a user of the device and/or other users (e.g., of other devices), and then process the sensory information to determine intent information associated with the user and/or the other users. As an example, the environment may include social interactions between the user and the other users, and the sensory information may include visual indicators, audio indicators, olfactory indicators, gustatory indicators, haptic indicators, posture indicators, and/or biological indicators. Moreover, in processing the sensory information, a data fusion process (e.g., Kalman filtering technique or other data fusion technique) may, for instance be utilized to determine the intent information. The following details and embodiments illustrate how intent-based monitoring using sensory information can be effectively utilized to guide or manage the actions, digital relationships, etc., of users, devices, applications, etc.

More specifically, the system 100 may determine to detect, at a device, sensory information from an environment, the environment relating to a user of the device, one or more other users, or a combination thereof. The system 100 may then process and/or facilitate a processing of the sensory information to determine intent information associated with the user, the one or more other users, or a combination thereof. By way of example, the environment may include, at least in part, one or more social interactions between the user and the one or more other users, and the sensory information may include, at least in part, one or more visual indicators, one or more auditory indicators, one or more olfactory indicators, one or more gustatory indicators, one or more haptic indicators, one or more posture indicators, one or more biological indicators, or a combination thereof.

As shown in FIG. 1, the system 100 comprises a user equipment (UE) 101 (or multiple UEs 101a-101n) having connectivity to a monitoring platform 103 via a communication network 105. The UE 101 may include or have access to an application 107 (e.g., applications 107a-107n) to enable the UE 101 to interact with, for instance, the monitoring platform 103 to: (1) detect, at the UE 101, sensory information from an environment relating to a user of the UE 101 or other users; (2) determine intent information associated with the user or other users based on the sensory information, other sensory information from other devices associated with the other users, etc.; (3) cause a notification or a modification of actions, digital relationships, etc., of the user, the UE 101, or an application of the UE 101 based on the intent information and based on associated policies; (4)

determine the associated policies based on context information of the user, the device, or the application; (5) or perform other functions. The monitoring platform 103 may include or have access to an intent database 109 to access or store detected sensory information, data for determining intent information, data for detecting sensory information, etc. The monitoring platform 103 may also include or have access to a policy database 111 to access or store policies relating to the user, the UE 101, or applications of the UE 101, notifications/modification actions to be taken based on the policies or intent information, context information, etc. Data stored in the intent database 109 and the policy database 111 may, for instance, be provided by the UEs 101, a service platform 113, one or more services 115 (or services 115a-115k), one or more content providers 117 (or content providers 117a-117m), and/or other services available over the communication network 105. For example, a certain service 115 may provide initial data for detecting sensory information as well as periodic updates for such data. However, the user of a particular UE 101 may further calibrate the UE 101 and, consequently, modify such data in the intent database 109. It is noted that the monitoring platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, close proximity network (e.g., Radio Frequency (RF) memory tag solutions), or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the monitoring platform 103 may cause, at least in part, a notification, a modification, or a combination thereof relating to one or more actions, one or more social network connections, or a combination thereof of the user, the device, one or more applications of the device, or a combination thereof based, at least in part, on the intent information. In one use case, it may be determined whether a particular user has the intent to perform a particular social activity including but not limited to establishing a friend-like digital relationship in his/her social network or emitting an intent to participate in an event. If, for instance, it is determined that the user intends to establish a "friend" connection with another user (e.g., based on sensory information derived from social interactions with the other user), a "friend" request may be transmitted to the other user. If, however, the intent information derived from the sensory information indicates a mismatch between the user and the other user, the other user may be placed on the user's blacklist (e.g., modifiable by the user). In another scenario, if it is determined that the other user intends to establish a "friend" connection with the user, a "friend" request may be transmitted to the user (e.g., via the user's mobile device). As such, the user may decide whether to accept based on the automatic "friend" request. Alternatively, the user's mobile device may automatically accept the "friend" request, for instance, based on one or more preferences of the user.

In another embodiment, the notification, the modification, or a combination thereof are further based, at least in part, on one or more policies associated with the user, the device, the one or more applications, or a combination thereof. In some embodiments, the one or more policies may include, at least in part, one or more privacy policies, one or more security policies, or a combination thereof. In one scenario, a security policy may prohibit employees from discussing company-related matters that are associated with certain predetermined security thresholds (e.g., matters assigned an "X" security level or higher) with non-employees. Thus, the system 100 may attempt to prevent the sharing of such company-related matters with non-employees. The system 100 may, for instance, cause an employee's mobile phone to detect sensory information from an environment that includes the employee or non-employee. Such sensory information may include (1) the tone, speed, volume, etc., of the employee's conversational voice, (2) the objects or content that the user is looking at, (3) the tone, speed, volume, etc., of the non-employee in speaking to the employee, (4) where the non-employee is looking with respect to the employee (e.g., is the non-employee looking at the employee's mobile phone display?), (5) the physical interactions between the employee and non-employee (e.g., shaking hands, hands on shoulder, etc.), (6) or any other sensory information (e.g., heart beat of the employee, how the employee is holding an object, etc.). As indicated, the sensory information may then be utilized to determine intent information with respect to the employee and/or the non-employee, wherein notifications or modifications relating to the actions of the employee, the employee's mobile phone, applications of the mobile phone, etc., may be initiated based on the intent information and the security policy. If, for instance, it is determined that the employee is intending to, or will be, discussing such company-related matters (or that the non-employee is attempting to solicit such information), the employee may immediately receive an alert on the employee's mobile phone to remind the employee that he/she should not be sharing such company-related matters. In this way, the employee will receive the reminder alert before he/she accidentally shares information, for instance, that is deemed by the company to be confidential. As a result, the sharing of the private or security-related matters with unauthorized personnel can be avoided.

In a further scenario, however, the employee may still discuss the company-related matters with the non-employee (e.g., the employee ignores the reminder alert, the employee does not see, hear, or feel the reminder alert, etc.). In such a case, a number of remedial actions may be taken. As an example, the employee may receive an automated phone call (e.g., as another reminder) to inform the employee that he/she should stop the conversation relating to the specific company-related matters. If, for instance, the employee's mobile phone is off, silent, or on vibrate, and the employee does not pick up, the system 100 may further cause the mobile phone to turn on and/or cause the mobile phone's settings to increase the mobile phone's ringer volume or vibration (e.g., setting the ringer volume or vibration to a maximum capacity) before initiating another automated phone call. As another example, the system 100 may cause the employee's mobile phone to record the conversation (e.g., audio recording, video recording, etc.) relating to the specific company-related matters for submission to policy officers/managers for review. Accordingly, the policy officers/managers may be able to better assess the potential violation of the privacy or security policies and take additionally remedial measures.

In another scenario, during a social interaction between a first user and a second user, the first user's mobile device may receive a message that contains confidential information. Upon hearing a "message received" alert, the first user may take out his mobile device to check the message. Without realizing the potential consequences, the first user may then start silently reading the message while the display of the mobile device is positioned in such a way that could be viewed by the second user (e.g., the first user is holding the mobile device between himself and the second user while the mobile device display is facing up). If, for instance, it is determined that the second user intends to, or will, look at the message based on the intent information, an application of the mobile device may be caused to take various steps to prevent the second user from viewing the message, to indicate to the first user that the message should be read in confidence, etc. Such steps may, for instance, include dimming the display, informing the first user that he must hold the mobile device in a vertical position to view the message, etc. In some cases, the monitoring platform 103 may check device connectivity (e.g., active connections) and the surrounding environment (e.g., based on the intent information generated from the sensory information of the environment) to determine when and where the first user is able to view the message. If, for instance, it is determined that may not be wise to open the message in the current environment, the monitoring platform 103 may inform the first user of the preventive actions (e.g., notify the first user that he should not open the message) before the first user opens the message, pause/terminate active connections to prevent the first user from opening the message, etc.

In another embodiment, the monitoring platform 103 may determine the one or more policies based, at least in part, context information associated with the user, the device, the one or more applications, or a combination thereof. By way of example, it may be determined that a user is outside of the office and that the user is socializing with other users who do not work for the user's company. Thus, the monitoring platform 103 may select the appropriate privacy or security policies for social interactions of employees outside of the particular office when the employees are interacting with non-employees, and then apply such policies for notification/modification purposes. Accordingly, future notifications or modifications, for instance, relating to restricting the distribution of information may be based on the selected policies.

In another embodiment, the monitoring platform 103 may receive other sensory information from one or more other devices associated with the one or more other users, wherein the intent information is based, at least in part, on the other sensory information. In one scenario, a first poker player and several other poker players may be engaging in a training session to improve their respective "poker faces" during poker games. For example, the players may place their respective mobile phones (or other monitoring devices) in their own individual areas on the poker table. The mobile phones may then monitor the sensory information of the particular poker environment to determine intent information with respect to the first player and the other players. Subsequently, the intent information may be used to provide each of the players with instructions (e.g., in the form of notifications) to improve their respective "poker faces," for instance, by informing the players how each of them gave himself/herself away (e.g., that a player was bluffing, not bluffing, etc.). In this way, the monitoring platform 103 may help the players restrict the amount of information that they distribute through their "non-poker faces" (e.g., the restriction may be based on policies that "prohibit" the revealing of such information which is deemed to be private). Although it may be sufficient for each of the mobile phones to monitor their respective owners, the additional monitoring of the other players by the plurality of mobile phones on the poker table may improve the intent information with regard to each of the players. Additional monitoring of the first player by the mobile phones of the two players next to the first player (e.g., a second player to the left of the first player and a third player to the right of the first player) may, for instance, supplement the sensory information detected by the first player's mobile phone with information regarding the first player's facial expressions from the respective angles of the two player's mobile phones. Moreover, the supplemental monitoring may also be provided to the second player and the third player by the two players respectively next to each of them. As such, the increased amount of sensory information may improve the accuracy and reliability of the intent information with respect to the first player and the other players.

In another scenario, sensory information and the other sensory information received from the one or more other devices may be used to determine whether the user (e.g., the current user) is the owner of the device. For example, the intent information determined from the sensory information and the other sensory information may be utilized to determine the user's behavior patterns (e.g., current and future patterns), which can then be compared to the owner's typical behavior patterns. If, for instance, the user is determined not to be the owner of the device, the monitoring platform 103 may take additional steps (e.g., require calibration for this particular user) and sensory checks to ensure the accuracy of the intent information. Additionally, or alternatively, the additional steps and sensory checks may be based on whether the device is determined to be stolen, borrowed by a trusted user, borrowed by an untrusted user, etc. (e.g., a trusted user may be a previous and frequent user of the device who the owner has explicitly allowed to use the phone). If, for instance, the device is determined to be stolen, confidential information on the device may be protected (e.g., access to such confidential information may be prevented, the confidential information may be altered to appear to the "thief" that the "stolen" status has not been detected, etc.) and location information of the device may be continuously reported to authorities (e.g., to assist in catching the "thief").

In another embodiment, the monitoring platform 103 may determine history information relating to one or more prior social interactions between the user and the one or more other users, wherein the intent information may be based, at least in part, on the history information. In one use case, previous social interactions between the user and the one or more other users may be stored and analyzed to determine previous sensory information and previous intent information. As such, the history information may include the previous sensory information and the previous intent information with respect to the user and the one or more users. Consequently, the current intent information and the current sensory information may be verified based on the history information, for instance, to ensure that the notifications and the modifications are appropriate for the current situation.

By way of example, the UE 101, the monitoring platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
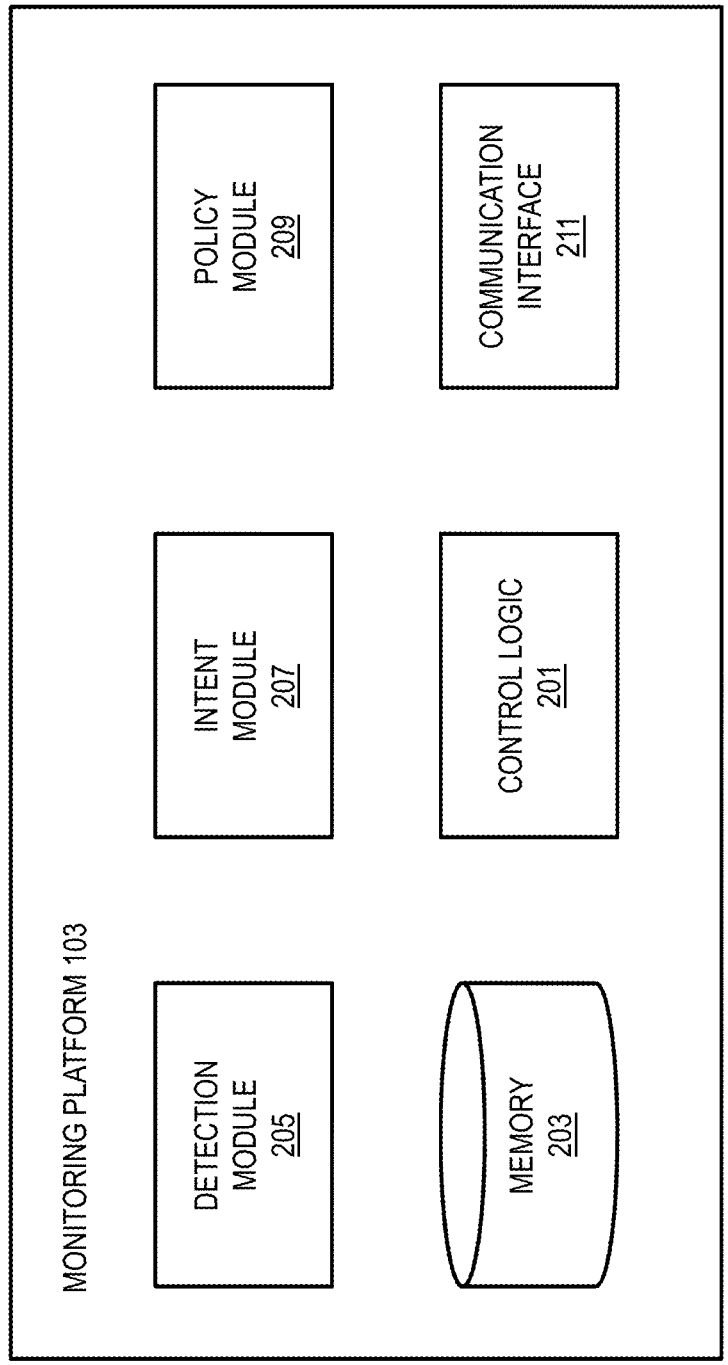
FIG. 2A is a diagram of the components of a monitoring platform, according to one embodiment.

FIG. 2A is a diagram of the components of a monitoring platform, according to one embodiment. By way of example, the monitoring platform 103 includes one or more components for providing intent-based monitoring using sensory information. It is contemplated that the functions of these components may be combined in one or more components or performed by other components of equivalent functionality. In this embodiment, the monitoring platform 103 includes control logic 201, memory 203, a detection module 205, an intent module 207, a policy module 209, and a communication interface 211.

The control logic 201 executes at least one algorithm for executing functions of the monitoring platform 103. For example, the control logic 201 may interact with the detection module 205 to determine to detect, at a device, sensory information from an environment, the environment relating to a user of the device and/or one or more other users. As discussed, the environment may include social interactions between the user and the other users. The sensory information may then be passed along (e.g., via the communication interface 211) to the intent module 207, which may subsequently process the sensory information to determine intent information associated with the user and/or the other users. Additionally, or alternatively, the intention information may be based on other sensory information from other devices associated with the other users. The other sensory information may, for instance, be received through the communication interface 211 and provided to the intent module 207 for processing.

It is noted that, in some embodiment, the sensory information and the other sensory information may include visual indicators, audio indicators, olfactory indicators, gustatory indicators, haptic indicators, posture indicators, and/or biological indicators. By way of example, visual indicators may include any indicators capable of being detected by a visual sensory system (e.g., human or animal eyes, various types of cameras, microscopes, telescopes, etc.). Audio indicators may include any indicators capable of being detected by an auditory sensory system (e.g., human or animal ears, microphones, etc.). Olfactory indicators may include any indicators capable of being detected by an olfactory sensory system (e.g., human or animal noses, electronic odor detectors, etc.). Gustatory indicators may include any indicators capable of being detected by a gustatory sensory system (e.g., human or animal taste receptors, electronic "tongues," etc.). Haptic indicators may include any indicators capable of being detected by a haptic sensory system (e.g., human or animal haptic-related nerves, electronic tactile and kinesthetic detectors, etc.). Posture indicators may include any indicators capable of being detected by a posture sensory system (e.g., a system that uses pressure sensors to analyze sitting posture). Biological indicators may include any indicators capable of being detected by a biological sensory system (e.g., systems that can detect and determine blood pressure, heart beat, alpha and beta waves, skin capacitance, etc.).

Moreover, the control logic 201 may direct the policy module 209 to cause a notification and/or a modification relating to an action, a social network connection, etc., of the user, the device, and/or an application of the device based on the intent information and policies associated with the user, the device, and/or the application. As discussed, in certain embodiments, the action may include distribution of information, and the notification and/or the modification may further relate to restricting the distribution of the information. In various embodiments, the policies may include privacy policies and/or security policies. Additionally, or alternatively, the policies may be determined (for causing the notification, the modification, etc., relating to the action of the user, the device, the application of the device, etc.) based on context information associated with the user, the device, and/or the application of the device. Such context information may, for instance, be detected by the detection module 205 or provided by other components of the system 100.

The control logic 201 may additionally utilize the communication interface 211 to communicate with other components of the monitoring platform 103, the UEs 101 (e.g., the device, the other devices, etc.), the service platform 113, the services 115, the content providers 117, and other components of the system 100. For example, the communication interface 211 may initiate notifications to the respective UEs 101 for the policy module 209 based on intent information and relevant policies. The communication interface 211 may further include multiple means of communication. In one use case, the communication interface 211 may be able to communicate over short message service (SMS), multimedia messaging service (MMS), internet protocol, email, instant messaging, voice sessions (e.g., via a phone network), or other types of communication.

Figure 2B:
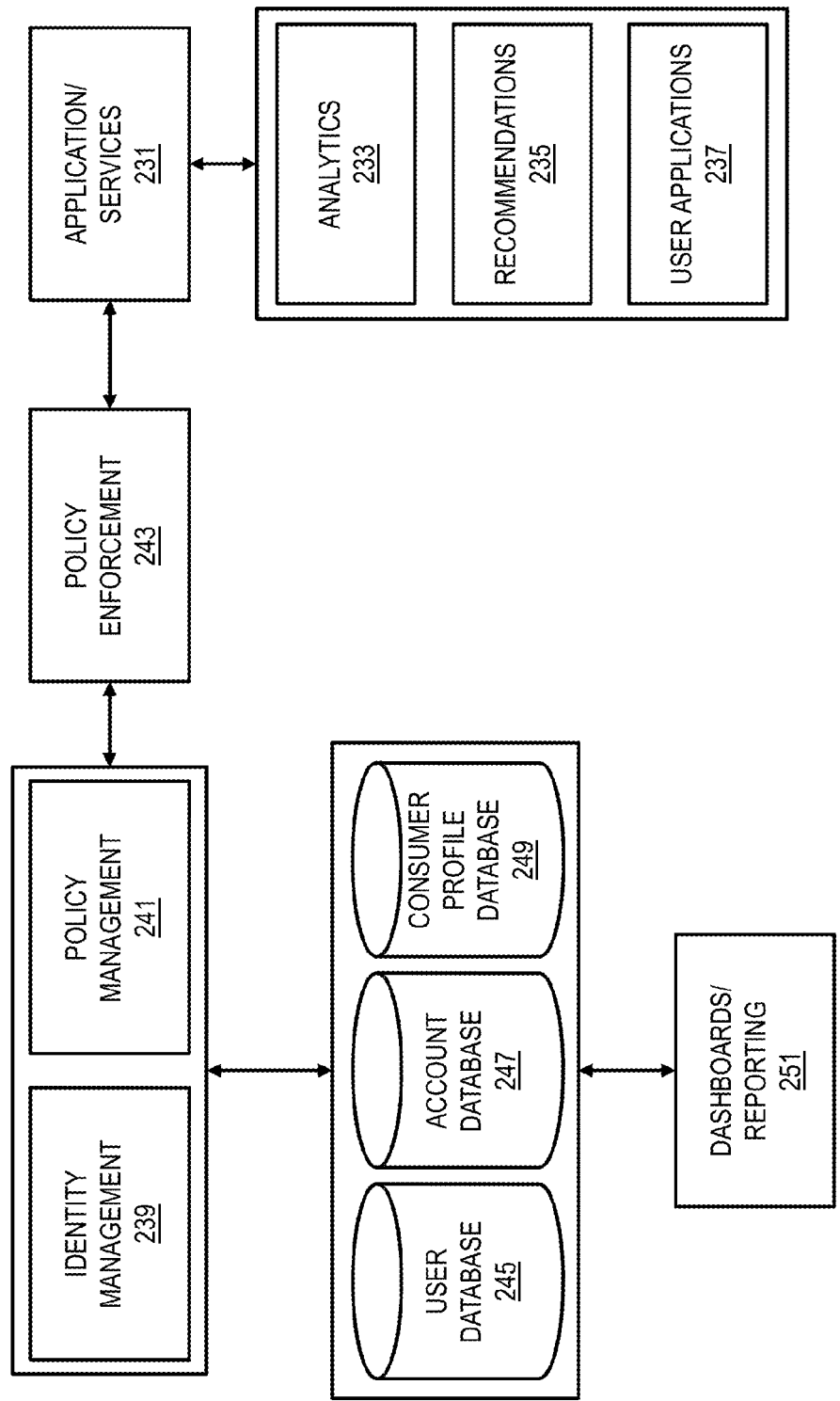
FIG. 2B is a diagram of relationships between various components for providing intent-based monitoring using sensory information, according to one embodiment.

FIG. 2B is a diagram of relationships between various components for providing intent-based monitoring using sensory information, according to one embodiment. As shown, the various components include applications and services 231, such as analytics 233, recommendations 235, and user applications 237 (e.g., third party applications, third party bridges, etc.), identity management 239, policy management 241, policy (or privacy) enforcement 243, storage that may include a user database 245, an account database 247, and a consumer profile database 249, and dashboards/reporting 251. Although some of these various components, such as applications and services 231, the analytics 233, and the dashboards/reporting 251, may be functionally similar (or even the same component in other embodiments), they are depicted in this embodiment as separate components to emphasize that each component may play a different role within the architecture as a whole. In some embodiments, such as in the case of devices, performance constraints (e.g., communication), offline situations, and the degree of control and trust over the device platform must be taken into consideration. In these situations, a device-caching and some degree of policy enforcement (as much as can be trusted on the device) may be implemented.

Figure 2C:
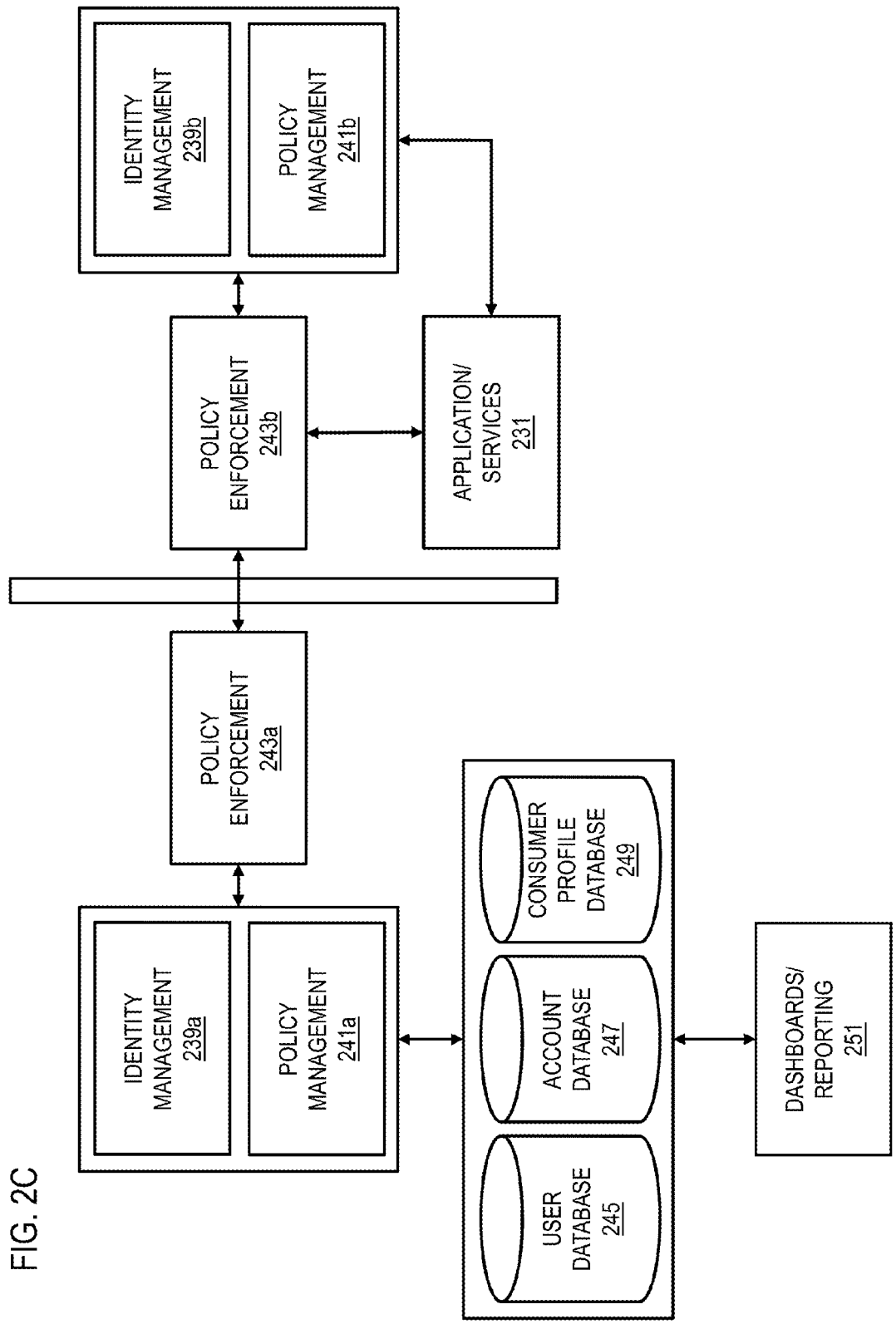
FIG. 2C is a diagram of relationships that include inbound and outbound data flow between components of various systems, according to one embodiment.

FIG. 2C is a diagram of relationships that include inbound and outbound data flow between components of various systems, according to one embodiment. Although both the diagrams in FIGS. 2B and 2C illustrate that a critical data flow is between the storage to the application/services 231 via the privacy enforcement 243, the diagram in FIG. 2C demonstrates a common situation where the data flow is subject to the privacy enforcement 243 (or privacy enforcement 243a) during the outbound flow (e.g., from cloud/storage toward the application and services 231, for instance, as the result of a query towards the storage). In addition, inbound data flow enforcement is required in some circumstances, such as with consumer data collection and some sharing scenarios (e.g., those directed to third parties).

It is noted that in service-side deployments, applications (e.g., applications and services 231) may need to be online to be accessed and have access to remotely stored data and authentication services. In device deployment environments, the limitations on connectivity inherent with mobile devices may need to be considered even though it can be assumed that internal communications within a device are typically fast. In this respect, the privacy enforcement 243 may be required to have a counterpart implemented on the device to ensure that policies are enforced during the offline cases. This requires that policies are synchronized and cached against the version existing in the server-side environment. In many cases, the device "cannot be trusted" because of the possibilities of hacking or installation of unauthorized software that can interfere with the policy enforcement process. This means that, in a typical online scenario, either the policy enforcement process is made with "best effort" on the device or the whole policy enforcement control is returned to the server-side.

With respect to data normalization, it may be necessary to ensure that data is logically partitioned within the system in order to provide a consistent method of storing and relating data together for the various applications and services that use the data. This means that a distinction may need to be made between: (1) the data required for the systems to work; (2) the data stored by the user; (3) the data describing the user's identity, preferences and behavior (e.g., both explicit and implicit) along with data relating to the devices in use by the consumer. These three categories may, for instance, be described as the data respectively stored in the user database 245, the account database 247, and the consumer profile database 249. It is noted that the physical and logical partitioning of data stored within the databases is an implementation decision not necessarily related to the above classifications which may be more related to usage. However these classifications may be related to particular security requirements upon the stored data. As the user is a key component, it is necessary to ensure that all the data can be linked together according to the rules of database normalization. As such, it may not be acceptable for individual services to manage and silo data individually because such actions may result in inconsistencies. For example, when managing lists of friends, contact books, addresses, etc., only one set of data is required unlike at present where two or three separate listings of contacts, addresses, etc., are being provided will little or no integration (and/or integrity) between these.

As mentioned, the user is a critical component. As a result, it may be necessary to ensure that the indexing and cross-referencing of user data is made according to an agreed and consistent identity mechanism. Based on this notion of the user identity being a key component by which data is accessed and indexed, we can more fully take advantage of explicit relationships between users as system data (e.g., data required for the functioning of services) such as the child-parent relationship and thus provide, for instance, more sophisticated mechanisms for better adherence to child protection laws.

It is noted that data classification may be performed according to a number of aspects. For example, data classification may be made primarily upon the type of data as provided by shared data model and upper data model definitions. Further classifications can be considered crosscutting aspects and these include: (1) the owner of the data; (2) the provenance or system of record of the data. Additional classifications for privacy may, for instance, include: (1) the sensitivity of the data; (2) the allowed usages of the data; and (3) the agents or entities with access to the data. Further aspects may relate to access control (access credentials) and data retention. It is also noted that policy management may be primarily concerned with the storage of policies and the addition, update, and deletion of policies in a consistent manner by the correct owner. The scope of policy management can be expanded to providing some rudimentary analysis of policies as well as facilities to "lock-down" policies under specific circumstances.

It is further noted that the user interface to policy management can be provided either explicitly or implicitly. For the explicit user interface, a direct access may be provided to the policy management system. Specific tailoring to the policy language and the dynamic nature of policies will have to be taken into consideration. The complexity of the user interface may vary between the full-featured web-page/API access to more limited and targeted user interfaces that will be necessary for presentation on devices. The implicit user interface may, for instance, be based around the idea of providing changes to policies based upon the users' actions. For example, when a user adds a contact to a given group such as a family group, then the privacy policies related to that contact may change by virtue of being included in that group. Related to this is the provision of suitable default settings for privacy, for example, when accepting the default terms and conditions. This can be extended, for instance, to the provision of "wizards" for automatically setting private policy for the user at account creation time or a number of other situations.

Figure 2D:
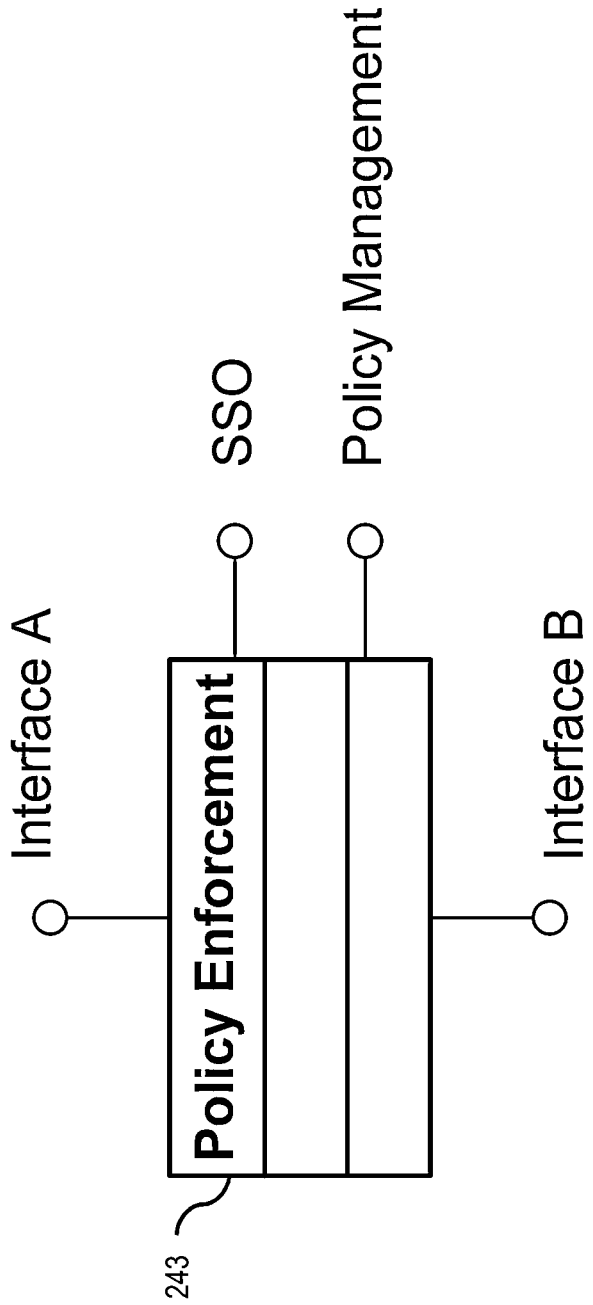
FIG. 2D is a diagram of a policy enforcement component, according to one embodiment.

FIG. 2D is a diagram of a policy enforcement component, according to one embodiment. As mentioned, a very critical component is the privacy enforcement mechanism (e.g., via the policy (or privacy) enforcement 243) which effectively acts as a pass-through processor for any flow of information. For the purpose of illustration, a simple diagram is provided. The policy enforcement 243 may, for instance have four interfaces including: (1) Interface A (e.g., the incoming data interface), (2) Interface B (e.g., the outgoing data interface), (3) a single sign-on (SSO) and authentication mechanism interface, and (4) a policy management interface (e.g., an interface to the storage of policies). In one use case, the policy enforcement 243 may be placed on the outgoing data flow, for instance, on the query results data flow on a database where results can be transformed as required. It is noted that the transformation of data can vary from either blocking or allowing data through (e.g., very much like access control) or to a full functional data transformation that provides mechanisms for the abstraction and anonymization of data. Interfaces A and B are effectively identical in that it must be possible to place the policy enforcement engine in a data flow without affecting the particular application programming interfaces (APIs) related to that data flow itself. The implementation of such a component (e.g., the policy enforcement 243) can be made in various ways, such as an integrative part of any architectural stack, as an operating system service, as a daemon, etc. The particular choice may depend upon the particular environment. Nonetheless, as all policy enforcement components effectively obtain their policies from the same sources, potentially more than one solution can be adopted simultaneously.

In certain embodiments, access control must be present at the database level to clearly define the set of raw data that a particular user can see. The granularity of access control may, however, vary. Typically, in this context, access control for the owner of the information and access control for those users who have access to shared data may need to be provided. Shared data may, for instance, refer to data which has been explicitly shared from one user to another or by a single user across multiple applications/groups/users. The granularity of sharing may vary from sharing to an individual user, to a specific group or potentially globally, etc. It is noted that several notions in cognitive radio (CR) already exploited, such as regional database, contextual manager, etc., may be utilized to underpin a discover of social networking and provide certain allowed interaction levels to form user (white or black) lists based on the results found and analyzed. Usage of group optimized connectivity and aligned needs are now connected with available geographically restricted content. For example user possible discovers and interactions at this geographical location (e.g., derived from a CR database) are prioritized less than in another social network environment. The social interaction in the right context forms the best match and provides space, time, or event dependent discovery results that will vary. For example certain people in different context (e.g. doctor and patient, doctor and friend, etc.) will provide wanted or unwanted results (e.g., joy vs. sweat).

Figure 8:
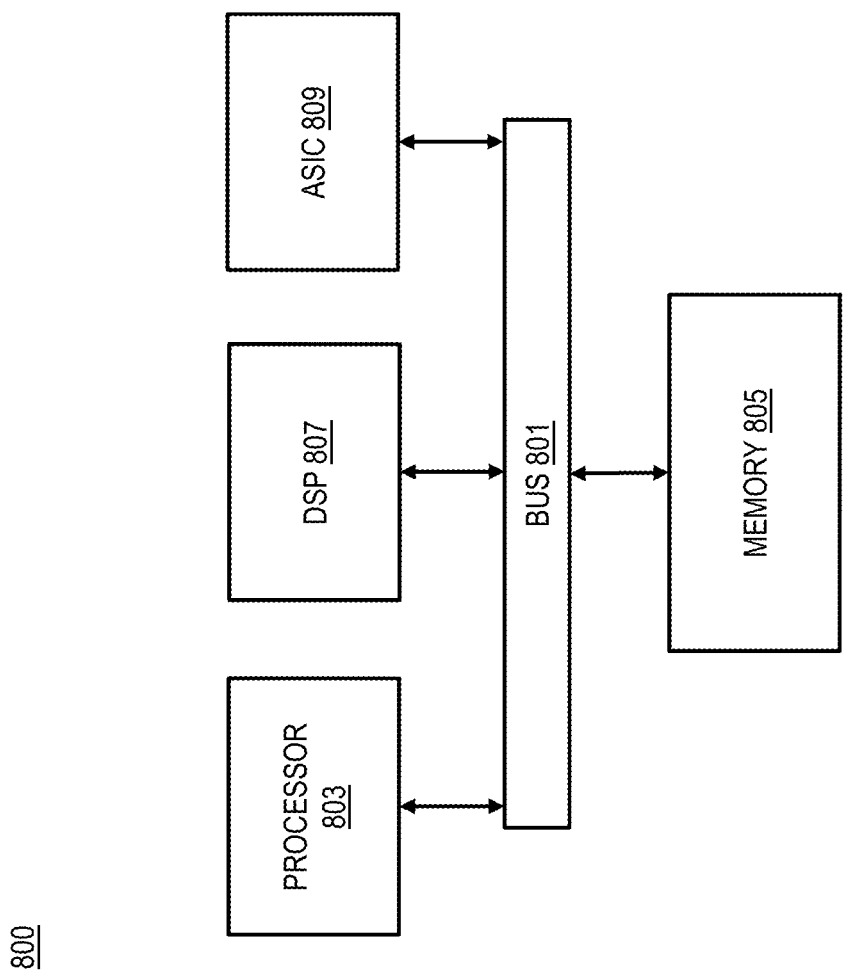
FIG. 8 is a diagram of a chip set that can be used to implement an embodiment of the invention.

FIG. 3 is a flowchart of a process for providing intent-based monitoring using sensory information, according to one embodiment. In one embodiment, the monitoring platform 103 performs the process 300 and is implemented in, for instance, a chip set including a processor and a memory as shown in FIG. 8. As such, the control logic 201 can provide means for accomplishing various parts of the process 300 as well as means for accomplishing other processes in conjunction with other components of the monitoring platform 103.

In step 301, the control logic 201 may determine to detect, at a device, sensory information from an environment, wherein the environment relates to a user of the device, one or more other users, or a combination thereof. As discussed, in various embodiments, the environment may include, at least in part, one or more social interactions between the user and the one or more other users, and the sensory information may include, at least in part, one or more visual indicators, one or more auditory indicators, one or more olfactory indicators, one or more gustatory indicators, one or more haptic indicators, one or more posture indicators, one or more biological indicators, or a combination thereof.

In step 303, the control logic 201 may process and/or facilitate a processing of the sensory information to determine intent information associated with the user, the one or more other users, or a combination thereof. By way of example, the intent information may include information relating to conduct that the user, the one or more other users, or a combination thereof intends to, or will, take. In one use case, a mobile device may determine that a user intends to grab the mobile device if, for instance, the mobile device detects that the user is looking at the mobile device and the user is walking towards the mobile device.

Figure 4A:
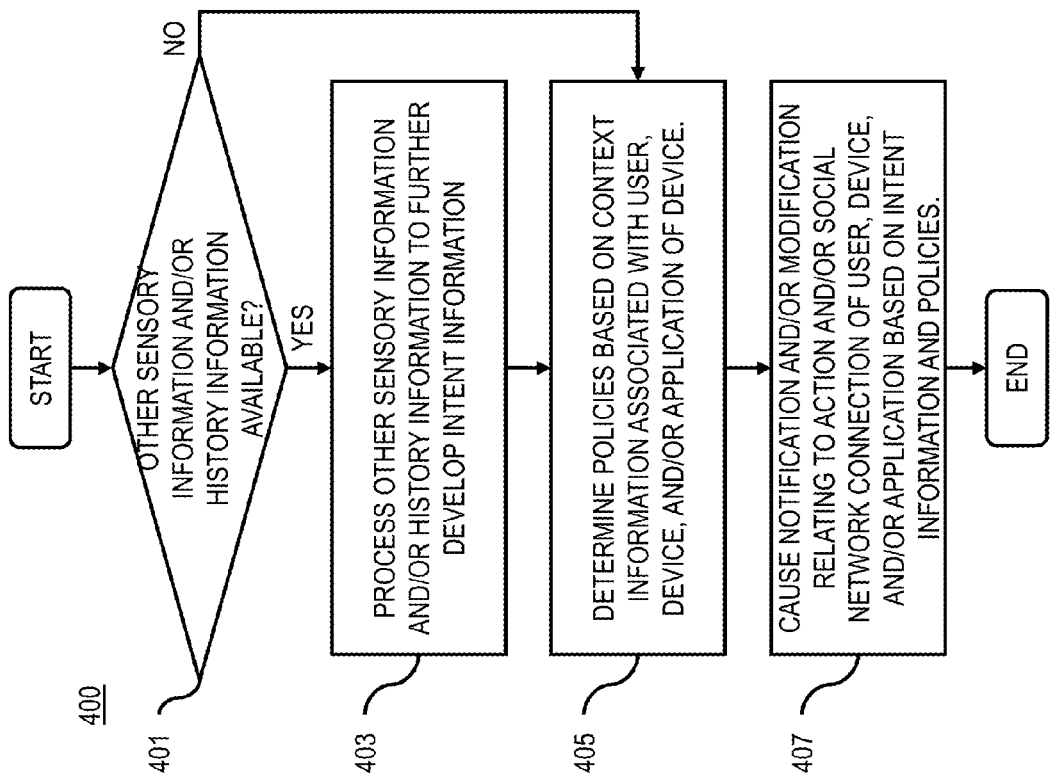
FIG. 4A is a flowchart of a process for providing a notification and/or a modification based on intent information and policies, according to one embodiment.

FIG. 4A is a flowchart of a process for providing a notification and/or a modification based on intent information and policies, according to one embodiment. In one embodiment, the monitoring platform 103 performs the process 400 and is implemented in, for instance, a chip set including a processor and a memory as shown in FIG. 8. As such, the control logic 201 can provide means for accomplishing various parts of the process 400 as well as means for accomplishing other processes in conjunction with other components of the monitoring platform 103.

In step 401, the control logic 201 may determine whether other sensory information from one or more other devices associated with the one or more other users has been received and/or whether history information relating to one or more prior social interactions between the user and the one or more other users is available. If, for instance, such information is available, the control logic 201 may, at step 403, further process and/or facilitate a processing of the other sensory information and/or the history information to further develop the intent information derived from the sensory information (e.g., the current sensory information from the current environment). Notwithstanding the availability of the other sensory information or the history information, the control logic 201 may, at step 405, determine one or more policies based, at least in part, on context information associated with the user, the device, the one or more applications, or a combination thereof (e.g., the location of the user (or the device), people that the user is interacting with, or any other context information). As discussed, in some embodiments, the one or more policies may include, at least in part, one or more privacy policies, one or more security policies, or a combination thereof.

In step 407, the control logic 201 may cause, at least in part, a notification, a modification, or a combination thereof relating to one or more actions, one or more social network connections, or a combination thereof of the user, the device, one or more applications of the device, or a combination thereof based, at least in part, on the intent information and based, at least in part, on one or more policies associated with the user, the device, the one or more applications, or a combination thereof. In some embodiments, the one or more actions may include, at least in part, distribution of information, and the notification, the modification, or a combination thereof may further relate to restricting the distribution of the information.

Figure 4B:
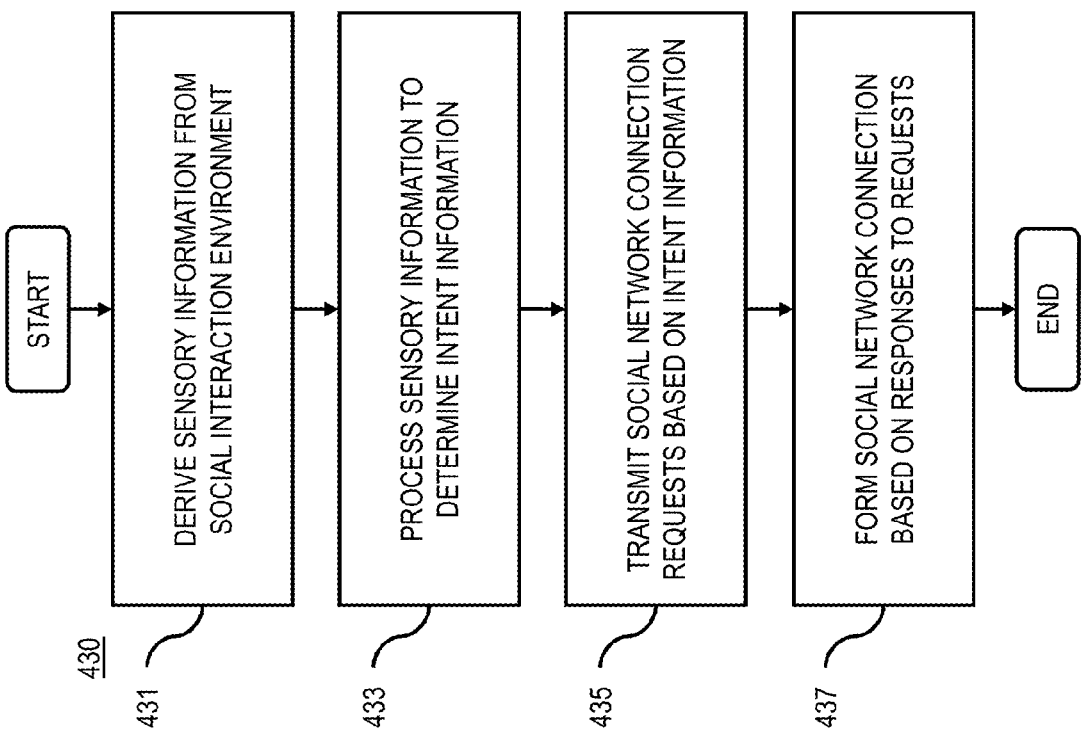
FIG. 4B is a flowchart of a process for forming social network connections using sensory information, according to one embodiment.

FIG. 4B is a flowchart of a process for forming social network connections using sensory information, according to one embodiment. In one embodiment, the monitoring platform 103 performs the process 430 and is implemented in, for instance, a chip set including a processor and a memory as shown in FIG. 8. As such, the control logic 201 can provide means for accomplishing various parts of the process 430 as well as means for accomplishing other processes in conjunction with other components of the monitoring platform 103.

In step 431, the control logic 201 may determine to derive sensory information from an environment that includes one or more social interactions between users. In one scenario, a user device may sense its user's blood pressure, skin capacitance changes, and alpha and beta wave rhythms (e.g., from the brain). In addition, the user device may sense its user's interaction tone, conversation tone, and tone pitches along with, for instance, how the user is holding the user device. The sensory data input may then be automatically analyzed (e.g., by the user device) verified against certain accuracy thresholds.

In step 433, the control logic 201 may process the sensory information to determine intent information, for instance, based on the context of the current environment (e.g., doctor/patient context, doctor/friend context, etc.). As mentioned, the data inputs (e.g., after being verified) may be processed by fusing the data signals, for instance, using a Kalman filtering covariance analysis process. If, for instance, a mismatch is indicated (e.g., the intent information derived from the sensory information indicated that there is something wrong with the social interaction between the respective users), the users may be alerted to the mismatch (and no social network connection requests will be submitted).

If, however, the intent information indicates that the respective users met each other's "friendship" qualification thresholds, the control logic 201 may assist with social networking connectivity, for instance, by transmitting, at step 435, social network connection requests based on the intent information. If the respective users acknowledge and accept the social network connection requests (e.g., a "friend" request), then a social network connection between the respective users may be formed, at step 437, based on the acceptance to the request. In some embodiments, whitelists or blacklists may also be formed based on the responses to the request. If, for instance, a first user accepts a "friend" request automatically transmitted on behalf of a second user, the second user may be placed on the first user's whitelist. On the other hand, if the first user declines the "friend" request, the second user may be placed on the first user's blacklist.

Figure 5:
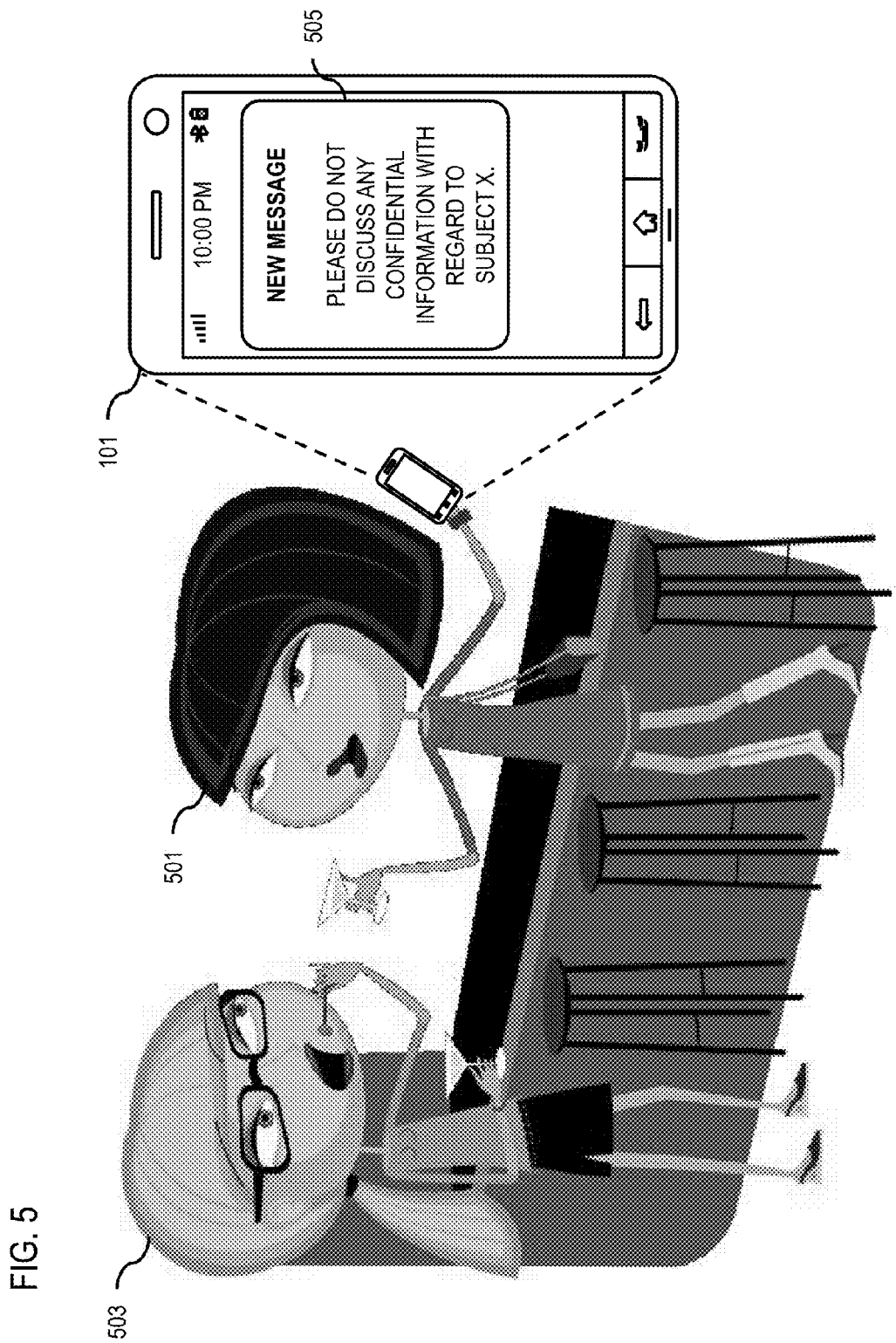
FIG. 5 is a diagram of monitoring social interactions using sensory information, according to one embodiment.

FIG. 5 is a diagram of monitoring social interactions using sensory information, according to one embodiment. As shown, users 501 and 503 are interacting at a social event outside of their respective company facilities. In this scenario, the users 501 and 503 are employees of the same company, but they work in different departments of the company. Based on their respective identities (e.g., entry-level employees of different departments in the same company), as well as the location and setting, the determined policies for this particular environment may prohibit the discussion of certain subject matter, for instance, relating to departmental projects that only user 501's department is working on (e.g., "Subject X").

Based on the sensory information, detected at the UE 101, from the particular environment relating to the users 501 and 503, it is determined that user 501 is intending to, or will, discuss matters relating to "Subject X." As such, a message notification 505 is transmitted to the UE 101 (which is currently being held by, and belongs to, user 501) to remind user 501 that she should not discuss any confidential information with regard to "Subject X." Moreover, as noted, many other approaches may be utilized to prevent users 501 and 503 from discussing or conversing about confidential information, or to prevent users 501 and 503 from conduct, that may, for instance, be against the company's private or security policies (e.g., a privacy meter on the UE 101 may illustrate to user 501 whether she should continue talking about the current subject matter with user 503). Additionally, or alternatively, sensory information detected by other devices (e.g., third party device on a bus/train may hear the discussion with respect to the confidential information) may also be utilized when determining to initiate the appropriate actions (e.g., the proper notifications or modifications to the actions of the user, the device, etc.). In this way, company policies may be enforced both in, and outside of, the office environment.

Figure 6:
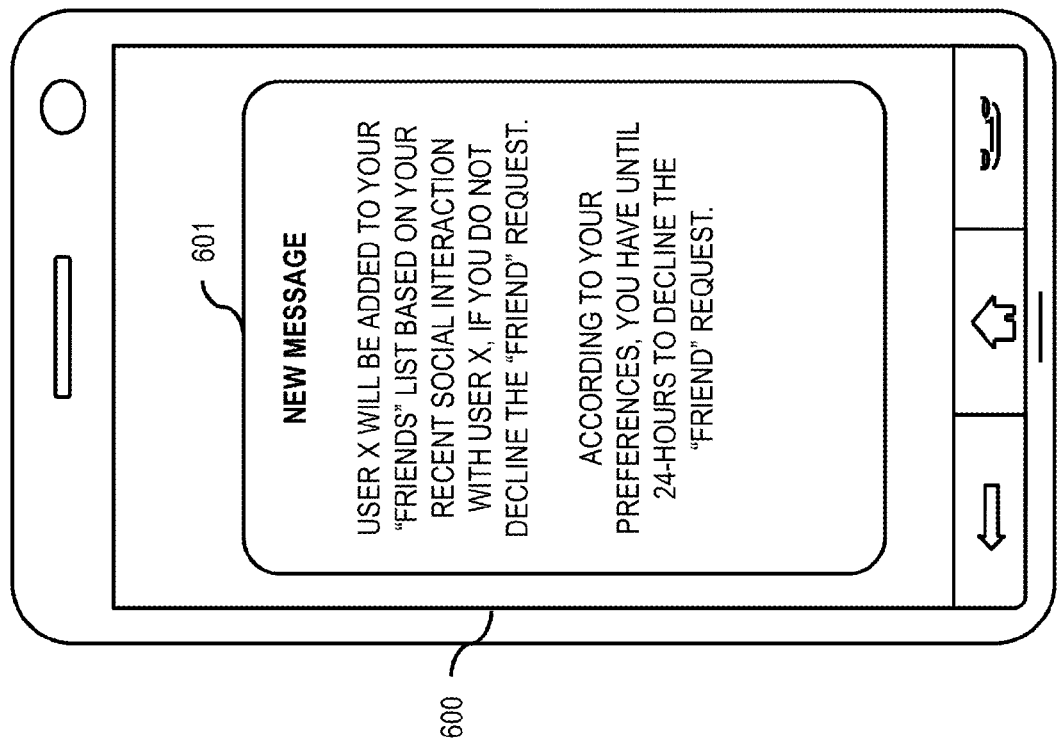
FIG. 6 is a diagram of a user interface utilizing intent-based monitoring with respect to social networking, according to one embodiment.

FIG. 6 is a diagram a user interface utilizing intent-based monitoring with respect to social networking, according to one embodiment. As shown, the user interface 600 features a notification 601 informing the user that User X will be added to the user's "friends" list based on the user's recent social interaction with User X if the user does not decline the "friend" request. As illustrated, the future modification of the user's "friends" list is based on the user's preferences, which may, for instance, enable automatic modifications to the user's "friends" list according to determined intent information. Such automatic modifications to the user's "friends" list are limited only by the twenty-four hour waiting period to reject such modifications. By way of example, User X may initially have been listed as the user's "acquaintance." However, due to frequent friendly social interactions between the user and User X, the determined intent information indicated that the user intends for User X to become a good friend. Additionally, or alternatively, the intent information may indicate that User X intends for the user to become a good friend. As such, the "friend" request may be automatically transmitted from User X's mobile device to the user's mobile device (or to the social network service) so that the user and User X may become "friends" on their social network.

The processes described herein for providing intent-based monitoring using sensory information may be advantageously implemented via software, hardware, firmware or a combination of software and/or firmware and/or hardware.

For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
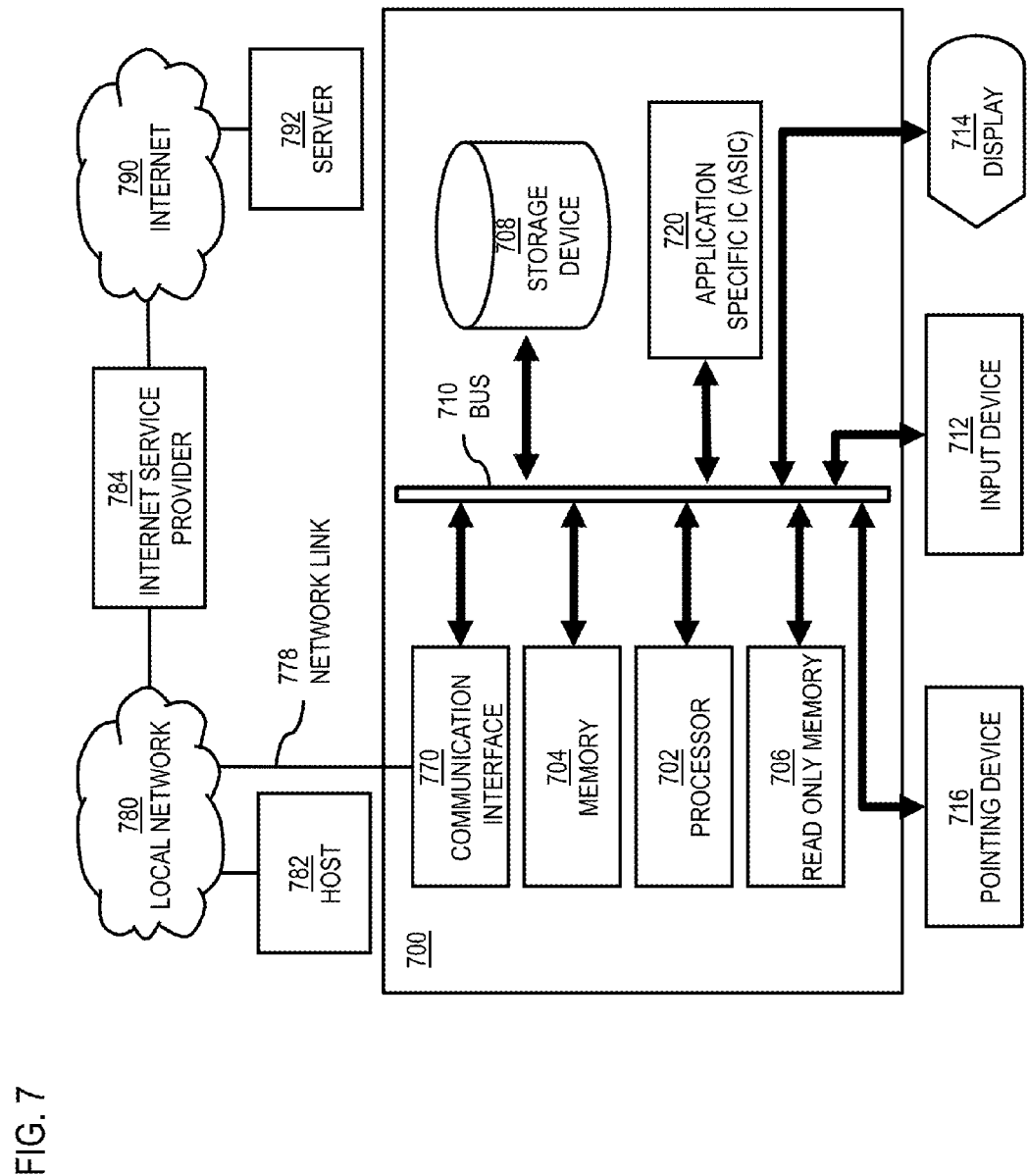
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide intent-based monitoring using sensory information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing intent-based monitoring using sensory information A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing intent-based monitoring using sensory information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing intent-based monitoring using sensory information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing intent-based monitoring using sensory information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing intent-based monitoring using sensory information to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide intent-based monitoring using sensory information as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing intent-based monitoring using sensory information.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide intent-based monitoring using sensory information. The memory 805 also stores the data associated with or generated by the execution of the inventive steps.

Figure 9:
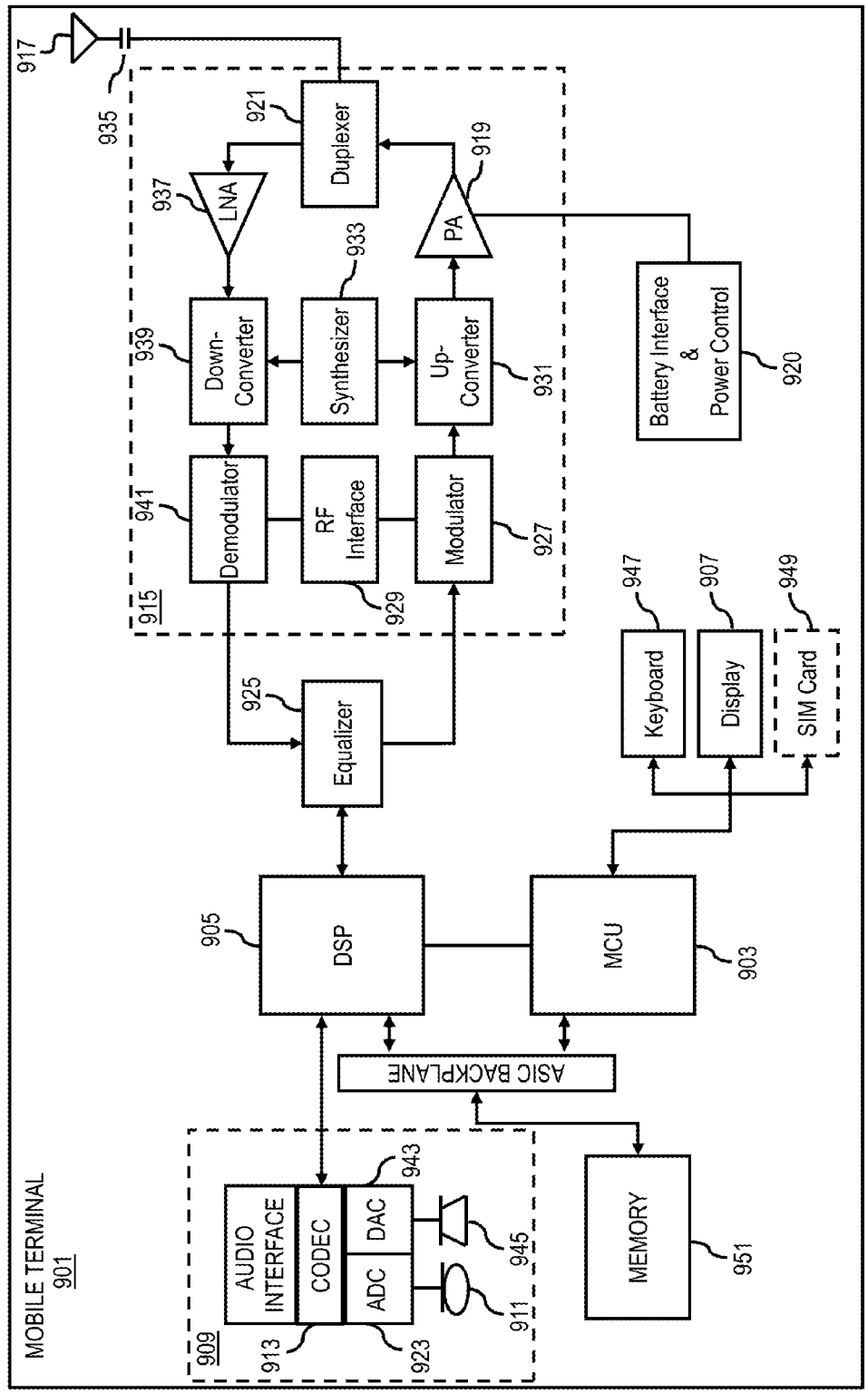
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing intent-based monitoring using sensory information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing intent-based monitoring using sensory information. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide intent-based monitoring using sensory information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, at a device, context information derived from sensory information detected from an environment, the environment and the sensory information relating to history information comprising one or more prior social interactions between a user of the device and one or more other users;
   processing the sensory information relating to the history information comprising one or more prior social interactions and the context information to determine intent information associated with the user with respect to a relationship with the one or more other users, wherein the intent information is based at least partially on the history information comprising the one or more prior social interactions;
   determining a digital relationship to be included in a privacy policy for the device based on at least the context information derived from the sensory information relating to the history information comprising the one or more prior social interactions, the digital relationship defining at least an allowance of blocking of data transmitted between the user of the device and the one or more other users; and
   modifying the privacy policy on the device based on the determined digital relationship, wherein the privacy policy indicates allowing or blocking incoming data associated with the digital relationship from another device of the one or more other users to the device, and allowing or blocking outgoing data associated with the digital relationship to the another device of the one or more other users from the device according to the privacy policy.

2. The method of claim 1, further comprising:
   initiating a notification, a modification, or a combination thereof relating to one or more actions, one or more social network connections, or a combination thereof of the user, the device, one or more applications of the device, or a combination thereof based on the intent information.

3. The method of claim 2, wherein the notification, the modification, or a combination thereof are further based on the privacy policy.

4. A method of claim 2, wherein the one or more actions include, at least in part, distribution of information, and wherein the notification, the modification, or a combination thereof further relate to restricting the distribution of the information.

5. The method of claim 1, further comprising:
receiving other sensory information from one or more other devices associated with the one or more other users,
wherein the intent information is based, at least in part, on the other sensory information.

6. A method of claim 1, wherein the sensory information includes, at least in part, one or more visual indicators, one or more auditory indicators, one or more olfactory indicators, one or more gustatory indicators, one or more haptic indicators, one or more posture indicators, one or more biological indicators, or a combination thereof.

7. The method of claim 1, wherein the sensory information comprises at least a biological indicator, and the context information is derived from at least the biological indicator, and the privacy policy is based on at least the biological indicator.

8. The method of claim 1, wherein the sensory information comprises at least a posture indicator, and the context information is derived from at least the posture indicator, and the privacy policy is based on at least the posture indicator.

9. An apparatus comprising:
at least one processor; and
at least one memory including computer program code for one or more programs,
the at least one memory and the computer program code configured to, with the at least one processor, cause the apparatus to perform at least the following:
determine, at a device, context information derived from sensory information detected from an environment, the environment and the sensory information relating to history information comprising one or more prior social interactions between a user of the device and one or more other users;
process the sensory information relating to the history information comprising one or more prior social interactions and the context information to determine intent information associated with the user with respect to a relationship with the one or more other users, wherein the intent information is based at least partially on the history information comprising the one or more prior social interactions;
determine a digital relationship to be included in a privacy policy for the device based on at least the context information derived from the sensory information relating to the history information comprising the one or more prior social interactions, the digital relationship defining at least an allowance of blocking of data transmitted between the user of the device and the one or more other users; and
modify the privacy policy on the device based on the determined digital relationship, wherein the privacy policy indicates allowing or blocking incoming data associated with the digital relationship from another device of the one or more other users to the device, and allowing or blocking outgoing data associated with the digital relationship to the another device of the one or more other users from the device according to the privacy policy.

10. The apparatus of claim 9, wherein the apparatus is further caused to:
initiate a notification, a modification, or a combination thereof relating to one or more actions, one or more social network connections, or a combination thereof of the user, the device, one or more applications of the device, or a combination thereof based on the intent information.

11. The apparatus of claim 10, wherein the notification, the modification, or a combination thereof are further based on the privacy policy.

12. An apparatus of claim 10, wherein the one or more actions include, at least in part, distribution of information, and wherein the notification, the modification, or a combination thereof further relate to restricting the distribution of the information.

13. An apparatus of claim 9, wherein the apparatus is further caused to:
receive other sensory information from one or more other devices associated with the one or more other users,
wherein the intent information is based, at least in part, on the other sensory information.

14. An apparatus of claim 9, wherein the environment includes, at least in part, one or more social interactions between the user and the one or more other users.

15. An apparatus of claim 9, wherein the sensory information includes, at least in part, one or more visual indicators, one or more auditory indicators, one or more olfactory indicators, one or more gustatory indicators, one or more haptic indicators, one or more posture indicators, one or more biological indicators, or a combination thereof.

16. The apparatus of claim 9, wherein the sensory information comprises at least a biological indicator, and the context information is derived from at least the biological indicator, and the privacy policy is based on at least the biological indicator.

17. The apparatus of claim 9, wherein the sensory information comprises at least a posture indicator, and the context information is derived from at least the posture indicator, and the privacy policy is based on at least the posture indicator.

* * * * *